Figure 5:
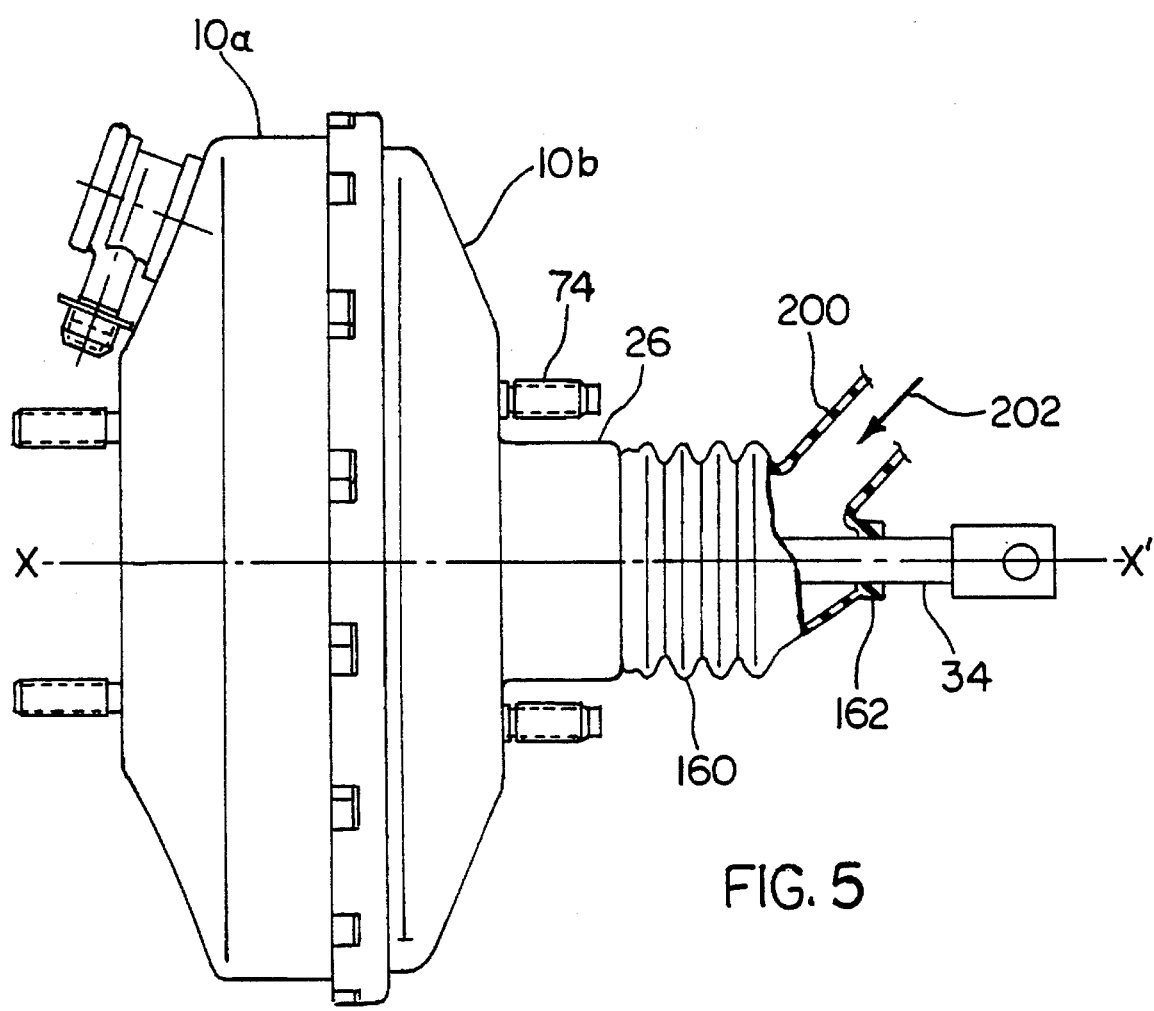

United States Patent [19]

Gautier et al.

[11] Patent Number: 5,487,324
[45] Date of Patent: Jan. 30, 1996

[54] PNEUMATIC BOOSTER

[75] Inventors: Jean P. Gautier; Ulysse Verbo, both of Aulnay-Sous-Bois; Miguel Perez, Argenteuil, all of France

[73] Assignee: Allied Signal Europe Services Techniques, Drancy, France

[21] Appl. No.: 50,200

[22] PCT Filed: Feb. 12, 1993

[86] PCT No.: PCT/FR93/00147

§ 371 Date: May 4, 1993

§ 102(e) Date: May 4, 1993

[87] PCT Pub. No.: WO93/19962

PCT Pub. Date: Oct. 18, 1993

[30]  Foreign Application Priority Data

Mar. 31, 1992 [FR] France .................. 92 03863

[51] Int. Cl.[6] ........................................ F15B 9/10
[52] U.S. Cl. ........................... 91/369.1; 91/376 R
[58] Field of Search .............. 91/369.1, 369.2, 91/376 R; 92/96, 98 R, 48

[56]  References Cited

U.S. PATENT DOCUMENTS

| | | | |
|---|---|---|---|
| 2,828,719 | 4/1958 | Ayers | 91/369.2 X |
| 3,768,366 | 10/1973 | Grabb et al. | 91/1 |
| 4,022,112 | 5/1977 | Putt et al. | 91/369.2 X |
| 4,531,370 | 7/1985 | Hendrickson et al. | 91/369.2 X |
| 4,653,382 | 3/1987 | Morimoto | 91/369.2 |
| 4,765,226 | 9/1988 | Bequet et al. | 91/376 R X |
| 4,800,799 | 1/1989 | Nishii | 91/369.2 |
| 5,031,507 | 7/1991 | Bornemann et al. | 91/369.1 |

FOREIGN PATENT DOCUMENTS 2247502  4/1992  United Kingdom.

*Primary Examiner*—Edward K. Look
*Assistant Examiner*—Hoang Nguyen
*Attorney, Agent, or Firm*—Larry J. Palguta; Leo H. McCormick, Jr.

[57]  ABSTRACT

A vehicle comprises an engine compartment and a passenger space which are separated by an apron (76), and a pneumatic brake booster comprises a casing (10) formed of a front shell (10a) and a back shell (10b) inside which is located a piston (20) including a back tubular part (22) and supporting a skirt (14) which, with the aid of an unrolling membrane (12), defines a first chamber (16), or front chamber, connected permanently to a source of partial vacuum and a second chamber (18), or back chamber, connected selectively to the front chamber (16) or to atmosphere by a valve mechanism (40) actuated by a control rod (34), the casing (10) of the booster comprising a mechanism (74) for securing the booster to the apron (76) of the vehicle. The booster further comprises a third chamber (65, 204) connected permanently to the atmosphere through a filter element (68, 212) and selectively to the second chamber (18) by the valve mechanism (40), the third chamber (65, 204) having a volume at least equal to the minimal volume of the second chamber (18).

8 Claims, 2 Drawing Sheets

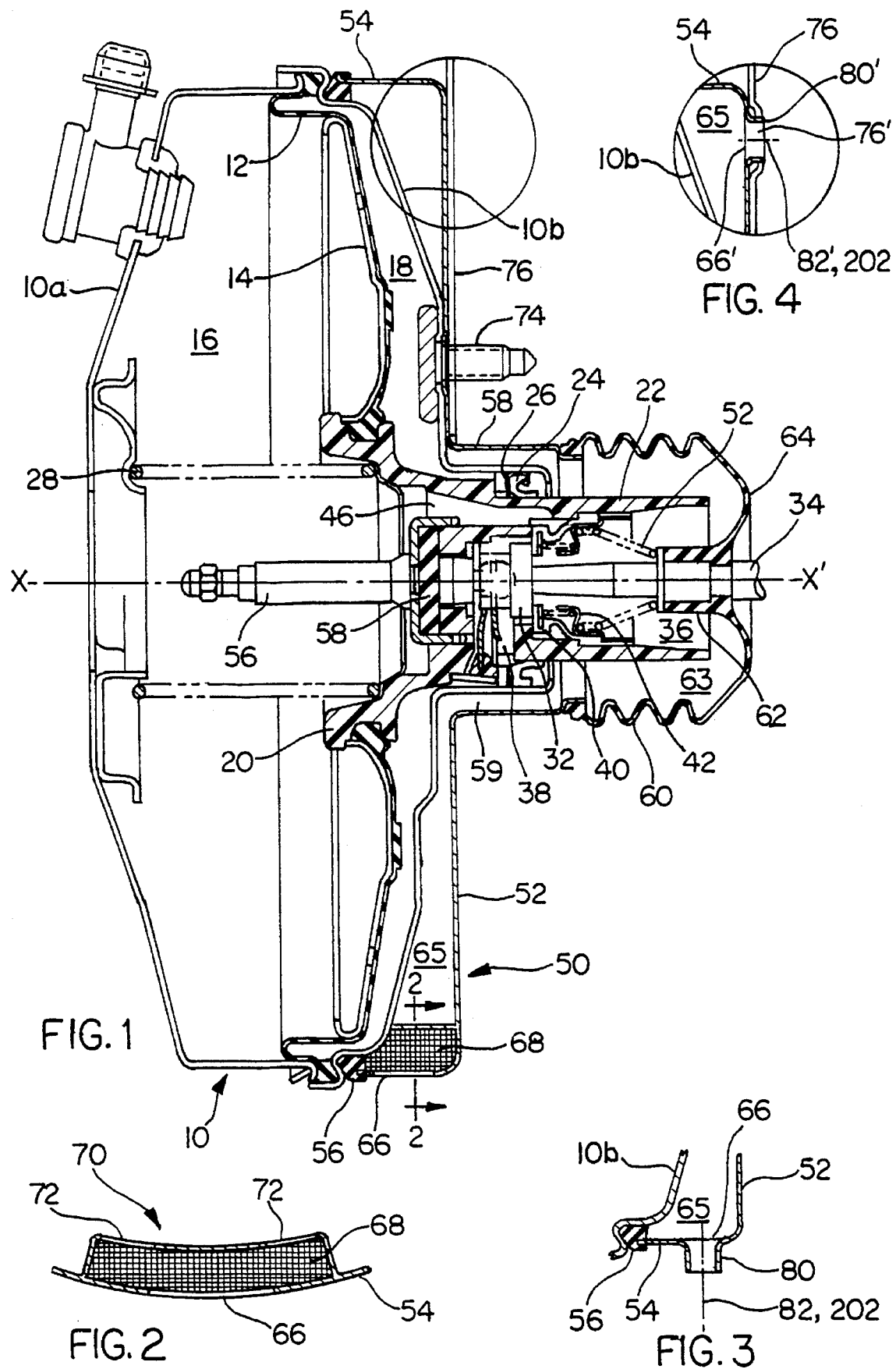

PNEUMATIC BOOSTER

The present invention relates to pneumatic boosters, more particularly of the type used in order to boost the braking of motor vehicles.

Boosters of this type are well known, for example from document U.S. Pat. No. 4,765,226, and conventionally comprise, in order to equip a vehicle comprising an engine compartment and a passenger space which are separated by an apron, a casing formed of a front shell and of a back shell and inside which is located a piston formed of a back tubular part supporting a skirt which, with the aid of an unrolling membrane, defines a first chamber, or front chamber, connected permanently to a source of partial vacuum and a second chamber, or back chamber, connected selectively to the front chamber or to the atmosphere by a valve means actuated by a control rod, the casing of the booster comprising means for securing the booster to the apron of the vehicle.

Such boosters, although giving satisfactory operation, nevertheless have some disadvantages. Thus, during a braking action, air at atmospheric pressure is sucked in toward the back chamber of the booster via a valve passage of reduced cross section, after having passed through an air filter to prevent the intrusion of dust or of impurities into the booster. Conventionally, as for example in the above-mentioned document, this air filter is disposed in the back tubular part of the piston, which part projects outside the back shell of the booster inside the passenger space of the vehicle.

During a braking action, the presence of the air filter slows the movement of the air in the direction of the back chamber of the booster and consequently increases the response time of the latter. Furthermore, the valve passage of reduced cross section as well as various components of the booster, such as springs for example, are located in the path taken by the air and generate various noises and hisses in the passenger space, which can become annoying.

It has already been proposed, as in U.S. Pat. No. 5,031,507, to displace the air suction orifice in order to combat the operation noise of the booster. Such a solution then has other disadvantages, since additional chicanes and filters are introduced into the path of the air in movement, which lead to increased response times, sometimes in unacceptable proportions.

The object of the present invention is therefore to design a booster whose response time is as short as possible, and which is silent in operation for the vehicle passengers.

To achieve this, the present invention provides a booster of the type set out above, which comprises a third chamber connected permanently to the atmosphere through a filter element, and selectively and directly to the second chamber by the valve means, this third chamber having a volume at least equal to the minimal volume of the second chamber.

Such a third chamber thus constitutes a reserve of air from which the booster can draw during its operation, without obstructing the movement of the air, and therefore reducing the response time of the booster.

Advantageously, this third chamber is formed between the back shell of the booster and the apron of the vehicle, so that the orifice for suction of the air at atmospheric pressure is located in the engine compartment. The booster operating noises are therefore produced in this compartment, which is by construction acoustically insulated from the passenger space.

Figure 6:
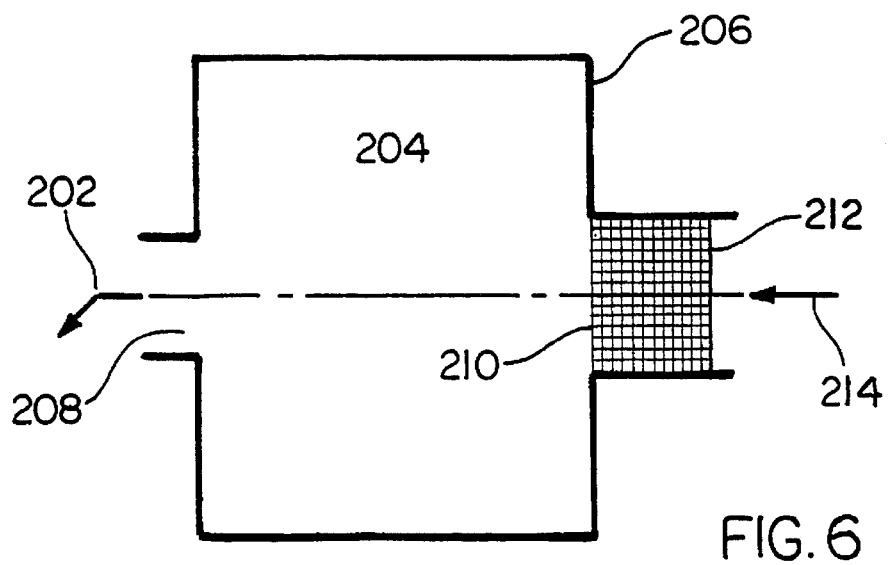

The invention will now be described by way of example with reference to the accompanying drawings in which:

FIG. 1 is a view in cross section of a booster constructed according to a first embodiment of the invention, FIG. 2 is a view in cross section along line 2—2 of FIG. 1, FIG. 3 is a view in cross section of a variant of the view of FIG. 2, FIG. 4 is a view in cross section of a variant of a detail of FIG. 1, FIG. 5 is a view in partial cross section of a booster constructed according to a second embodiment of the invention, and FIG. 6 is a view in cross section of a third chamber for the booster of FIG. 3.

FIG. 1 gives a view in cross section of a pneumatic brake-booster, designed to be placed in the usual manner between the brake pedal of a vehicle and the master cylinder controlling the hydraulic brake system of the vehicle.

By convention, the part of the booster turned toward the master cylinder is termed the "front" thereof and the part of the booster turned toward the brake pedal, the "back". In FIGS. 1 and 3, the front is therefore to the left of the figures and the back to the right.

The booster shown in FIG. 1 is well known and will be described only briefly. It comprises an outer casing 10 formed by joining a front shell 10a and a back shell 10b, having a symmetry of revolution about an axis X-X'.

A flexible unrolling membrane 12 of elastomer, reinforced in its central part by a metal support disk 14 also termed skirt, defines a front chamber 16 and a back chamber 18 inside the space delimited by the casing 10. The outer peripheral edge of the membrane 12 is secured in leaktight manner onto the outer casing 10, for example at the joint of the front shell 10a and back shell 10b. The inner peripheral edge of this same membrane terminates with a bead received in leaktight manner in an annular groove formed on the outer peripheral surface of a hollow booster piston 20 disposed along the axis X-X' of the booster. This hollow piston 20 extends backward in the form of a tubular part 22 which passes in leaktight manner through the back wall of the casing 10. The leaktightness of this passage is ensured by a reinforced annular seal 24 which is secured in a tubular central part 26 extending backward the wall of the back shell 10b.

A compression spring 28 interposed between the piston 20 and the front shell 10a normally maintains the piston 20 and the skirt 14 in a backward rest position shown in the figure, in which the back chamber 18 has its minimal volume and the front chamber 16 its maximal volume.

In its central part situated between the tubular back part 22 and the front part in which the membrane 12 and the skirt 14 are secured, the piston 20 has a bore in which a plunger 32 is slideably received which also has a symmetry of revolution about the axis X-X'. The front end of a control rod 34 of the booster, also disposed along the axis X-X', is mounted in the manner of a ball joint in a blind bore formed at the back of the plunger 32.

The back end (not shown) of this rod 34, which projects outside the tubular part 22 of the piston 20 is controlled directly by the brake pedal of the vehicle (not shown).

The annular space 36 delimited between the control rod 34 and the tubular part 22 of the piston 20 can communicate toward the front with the back chamber 18 through a radial passage 38 formed in the central part of the piston when the boost means controlled by the plunger 32 are actuated.

Conventionally, these boost means comprise a threeway valve comprising an annular valve 40 mounted in the tubular part of the piston and two annular valve seatings formed respectively on the central part of the piston 20 and on the plunger 32.

The valve 40 constitutes the front end, of smaller diameter, of a flexible sleeve of elastomer whose back end terminates with a bead mounted in leaktight manner inside the tubular part 22 of the piston 20. This bead is held in place by a metal cup 42, against which bears a compression spring tending to displace the valve 40 forward.

An annular valve seating is formed on the back end face of the plunger 32, and an annular valve seating is formed on the back end face of the central part of the piston 20. Depending on the position of the plunger 32 inside the piston 20, this arrangement enables the valve 40 to bear constantly in leaktight manner against at least one of the valve seatings under the action of the compression spring.

A second passage 46 is formed in the central part of the piston 20, approximately parallel to its axis X-X', so as to cause the front chamber 16 of the booster to comunicate with the annular space around the valve 40, inside the tubular part 22 of the piston 20. When the plunger 32 occupies its backward rest position, the front chamber 16 and back chamber 18 of the booster communicate with one another via the passage 46 and the passage 38.

In a manner itself also conventional, at least one stop member mounted in the central part of the piston 20 delimits the axial travel of the plunger 32 inside the latter. The plunger 32 is normally maintained in the backward rest position defined by this stop member by means of a compression spring 52 interposed between the cup 42 and a washer bearing against a step formed on the control rod 34.

In its central part, the piston 20 comprises an annular front face which acts on a back face of a thrust rod 56, through a reaction disk 58 in a deformable material such as an elastomer.

The operation of this known booster is conventional and may be described succinctly in the following manner.

When the booster is installed on a vehicle, the front chamber 16 communicates permanently with a vacuum source.

In a first stage, the force exerted on the brake pedal by the driver has the effect of causing the control rod 34 and the plunger 32 to advance so that the valve 40, under the action of the spring 44, follows the seating of the plunger 32, until it comes into contact with the seating of the piston; the front chamber 16 and back chamber 18 of the booster are then isolated from one another.

In a second phase of the operation of the brake, the plunger 32 is displaced sufficiently forward for the valve 40 to come into leaktight contact with the seating of the piston and to begin to move away from the plunger seating. Under these conditions, the back chamber 18 of the booster is isolated from the front chamber 16 and enters into communication with the annular space 36.

The back chamber 18, which was previously in communication with the front chamber 16 and was therefore under a reduced pressure, then sucks in air at atmospheric pressure through the radial passage 38 and the valve passage of small cross section between the valve 40 and the plunger seating. This then results in a substantial obstruction to the passage of the air due to the narrowness of the clearance of the valve passage which is detrimental to the response time of the booster and which creates turbulence in the airflow and hissing.

The response time of the booster is affected all the more because, in conventional boosters such as those of the abovementioned documents, an air filter is disposed inside the back part of the tubular part 22, so as to avoid the intrusion of impurities or of dust into the annular space 36, and therefore into the booster.

These disadvantages are avoided by virtue of the booster constructed according to the invention. In fact, the invention provides for the booster to be fitted with a third chamber constituting a reserve of air from which the booster will be able to draw during its operation without obstructing the movement of the air before its arrival in the annular space 36.

In the example shown in FIG. 1 the booster is seen to be provided with a housing 50, which also has a symmetry of revolution about the axis X-X'. This housing 50 is formed of a disk-shaped wall 52 of outer diameter virtually equal to that of the casing of the booster and extended forward at its outer peripheral edge by a front cylindrical part 54. This cylindrical peripheral part 54 is secured in leaktight manner to the casing 10, and more precisely to the back shell 10b of the booster in the example shown, by means of a seal 56. The disk-shaped wall 52 is also extended backward, at the edge of a central aperture of diameter greater than that of the tubular part 26 of the back shell 10b, by a back cylindrical part 58 of axial length close to that of the tubular part 26 and delimiting with the latter an annular space 59. At the back end of this back cylindrical part 58 is secured in leaktight manner the front end of flexible tubular bellows 60, whose back end 62 is secured in leaktight manner onto the control rod 34. The bellows 60 has an axial length greater than that of the back tubular part 22 of the piston 20 and delimits with the latter an annular space 63. It has moreover an intermediate part 64 joined to the back part 62 and having toward the front a concave shape. A third chamber 65 is therefore seen to be formed in the space delimited by the back face of the back shell 10b of the casing 10, the cylindrical peripheral part 54 and the disk-shaped part 52 of the housing 50. This third chamber 65 is connected permanently and directly with the annular space 36 upstream of the annular valve 40 by the annular spaces 59 and 63.

In the cylindrical wall 54 of the housing 50 is formed an aperture 66, opposite which is encapsulated, in the housing 50, a filter element 68. The capsule 70 containing the filter 68, shown in cross section in FIG. 2, has, on its wall directed toward the inside of the housing 50, apertures 72 offset with respect to the aperture 66 so as to obtain a chicane-shaped passage for the air passing through the filter 68.

When the booster is secured onto the apron of the vehicle, the housing 50 is disposed so that the aperture 66 is directed downward, so as to avoid, by virtue of the combined action of the filter 68 and of the chicane-shaped passage between the apertures 66 and 72, the intrusion of dust or of liquids inside the housing 50, as for example during a pressurized washing of the vehicle or of the engine.

The booster may for example be secured onto the apron by means of screws 74, the head of which is located inside the second chamber 18 and the threaded part of which passes in leaktight manner through the back shell 10b, in order to penetrate into an aperture of the apron 76, behind which it is retained by a locking means such as a nut (not shown). In the example shown, the screw 74 passes through the third chamber 65, advantageously in a leaktight manner so as not to lessen, or even nullify the effect of the filter 68.

The operation of the booster constructed according to the present invention will easily be understood from the preceding explanations. In fact, during the actuation of the booster, and more particularly during the second phase described above, in which the back chamber 18 is placed in communication with the annular space 36, the latter is in constant and direct communication with the third chamber 65. The back chamber 18 can therefore suck in the air at atmospheric pressure present in the annular spaces 36, 63 and 59 and in the third chamber 65 constituting a reserve of air from which the chamber 18 can draw freely and directly without being obstructed by the air filter usually placed in the annular space 36. The booster response time is therefore reduced thereby to a substantial extent, and this all the more so, the greater the volume of the reserve of air in the chamber 65 and the spaces 59, 63 and 36.

It has been observed, with the booster constructed according to the invention, that although the improvement in the response time is already appreciable for braking actions where only a slowing down of the vehicle is desired, it is on the contrary substantial for abrupt or intense braking actions intended to stop the vehicle immediately. From this point of view, and in order not to increase disproportionately the overall dimensions of the booster thus fitted with the reserve third chamber 65, while retaining the advantage of this reserve of air, the third chamber 65 is given a volume at least equal to the minimal volume of the back chamber 18. With such a configuration, during heavy braking, the reserve of air has a volume sufficient to supply the entire volume of the back chamber at the start of the braking, with a minimal response time and a maximal boost, which responds well to the driver's wish to brake effectively and rapidly.

Moreover, this booster construction according to the invention makes it possible to reduce and even to eliminate the operating noises of the booster transmitted into the passenger space of the vehicle. In fact, in the example shown in FIG. 1, it has been seen that the booster is secured by its back shell onto the apron of the vehicle. The third chamber is in this example formed between the back shell of the booster and the apron of the vehicle. As a result, the orifice 66 formed in the cylindrical wall 54 of the housing 50 opens into the atmosphere present in the engine compartment of the vehicle. It follows that the operating noises of the booster are confined in the annular spaces 36, 63 and 59 and in the third chamber 65, from which they can escape only through the orifice 72, the filter 68 and the aperture 66 opening into the engine compartment. The latter has formed the object of all the efforts of motor vehicle manufacturers as far as acoustic insulation for the passenger space is concerned, and the booster operating noises which are of much lower intensity than those of the heat engine itself, will therefore be inaudible to the driver and the passengers of the vehicle.

Advantageously, by virtue of the invention, the intermediate part 64 of the bellows 60 is constructed so that it has, toward the booster, a concave shape, joined in a continuous manner to the cylindrical back part 62 of the bellows 60. Thus, during the operation of the booster, the air originating from the third chamber 65 through the annular spaces 59 and 63 is guided without any discontinuity or obstacle toward the annular space 36. This guiding of the air participates simultaneously in improving the response time and in reducing the noises by minimizing the turbulence of the air in movement.

It is therefore clearly apparent that a booster has been produced, according to the invention, whose response time is greatly reduced since a reserve of air is provided upstream of the three way valve and communicates directly and without obstruction with the back chamber of the booster during its operation, and whose operation is silent since the air which the booster needs for its operation is sucked in directly from the engine compartment.

Of course, the invention is not limited to the embodiment which has just been described with reference to FIGS. 1 and 2, but is capable of accepting many variants which will be apparent to the person skilled in the art and which fall within the scope thereof. Thus, FIG. 3 shows a variant of the embodiment of FIG. 2. According to this variant, the aperture 66 made in the cylindrical part 54 of the housing 50 is no longer associated with an air filter, but is formed inside a tubular cylindrical extension 80, extending for example outside the housing 50. A pipe shown diagrammatically at 82, preferably flexible, has one of its ends connected to this tubular extension 80, and its other end is associated with a filter element, for example an element of the engine using filtered air. The pipe 82 could for example be joined to the carburettor of the engine if the latter is fitted with one, and more particularly downstream of the carburettor air filter. When the variant shown in FIG. 3 is preferred, it is of course not necessary for the aperture 66 to be directed downward; it may on the contrary be disposed in any place which will facilitate access to it. One advantage offered by this variant is that during vehicle maintenance operations, only one air filter needs to be changed.

Provision may also be made, as shown in FIG. 4, to no longer construct the aperture 66 in the cylindrical part 54 of the housing 50, but in its disk-shaped part 52, with a tubular cylindrical extension 80' passing in leaktight manner through an aperture 76' in the apron 76. This aperture 76' may advantageously be disposed at a place on the apron covered by the dashboard on the passenger space side so as not to reintroduce into the passenger space the noises which one is endeavoring to avoid therein. It will then be easy to secure to the tubular extension 80' a pipe 82' fitted with an adequate filter (not shown) under the dashboard.

An additional advantage of the variants of FIGS. 3 and 4 is that the volume contained in the pipes 82 or 82' contributes to enlarging the reserve of air available for the operation of the booster.

Another advantage may be found in combining the embodiments of FIGS. 2 or 3 with that of FIG. 4. The reserve of air contained in the third chamber 65 can then be renewed simultaneously through the apertures 66 and 66', each fitted with a filter, in the chamber 65 or at the end of the pipe 82 and at that of the pipe 82'. It is also possible to use the apertures 66 and 66' in order to renew the reserve of air in the third chamber 65 even outside the operating periods of the booster. A forced circulation of air can be established in the third chamber 65, the air being admitted therein for example by the pipe 82, into which is inserted a fan or a pneumatic pump (not shown), and escaping in a natural manner via the aperture 66', which need not then be associated with an air filter. A reserve of air in the third chamber 65 is thus obtained for the operation of the booster, in which the air is in movement. The operation of the booster as has been previously described is unchanged, except in that the slight overpressure in the third chamber 65 is an additional factor for reducing the booster response time. Moreover, the circulation of air in the third chamber 65 serves to cool the walls of this chamber, and in particular of the back shell 10b of the booster, which may be necessary in the case where the latter is constructed of plastic material, in order to avoid its deformation under the effect of the heat prevailing in the engine compartment.

FIGS. 5 and 6 show in partial cross section a second embodiment of the invention, where the reserve of air for the operation of the booster is constructed independently of the latter. The booster is, conventionally as in the abovementioned document U.S. Pat. No. 4,765,226, formed of two shells 10a and 10b, the latter comprising a tubular central back part 26, housing the tubular part of the booster piston containing the three-way valve. To the back end of this tubular part 26 is secured in leaktight manner the front end of flexible tubular bellows 160, whose back end 162 is secured in leaktight manner onto the control rod 34.

The bellows 160 are formed with a tubular extention 200 extending in a direction forming an angle with the axis X-X' of the booster. This tubular extension is intended to be connected, by a pipe shown diagrammatically at 202, preferably flexible, to a third chamber permanently connected to the atmosphere through a filter element.

This third chamber may for example be constituted by the third chamber 65 shown in FIG. 1. In this case the pipe 202 and the pipe 82' are merged, the pipe 202 then being Joined to the tubular cylindrical extension 80' of the housing 50 passing through the apron 76, and the housing 50 comprising the aperture 66 with its filter 68 or with the tubular extension 80. In this case also, the housing 50 does not comprise any cylindrical back part 58, the disk-shaped wall 52 of the housing 50 being secured or maintained in leaktight manner on the back shell 10*b* of the booster.

This third chamber may also be constituted on the inside 204 of an enclosure 206 provided with an aperture 208 in order to connect it via the pipe 202 to the bellows 160, and provided with another aperture 210 fitted with a filter 212 in communication with the atmosphere 214. Since such an enclosure 204, is not subject to the same dimensional constraints as the housing 50, it may have any shape and any desired volume in order to facilitate its installation in the vehicle. It may also be joined to the tubular extension 80 shown in FIG. 3.

We claim:

1. A pneumatic brake-booster for a vehicle comprising an engine compartment and a passenger space which are separated by an apron, the booster comprising a casing formed of a front shell and of a back shell and inside which is located a piston comprising of a back tubular part and supporting a skirt which, with the aid of an unrolling membrane, defines a first chamber connected permanently to a source of partial vacuum and a second chamber connected selectively to a one of the front chamber and to atmosphere by valve means actuated by a control rod, and the casing comprising means for securing the booster to the apron of the vehicle, the booster comprising a third chamber connected permanently to atmosphere through a filter element and selectively to the second chamber by the valve means, the third chamber being partially delimited by a bellows secured in leaktight manner to the control rod, by a back face of the back shell and by a front face of a housing secured in leaktight manner to the casing of the booster and onto which the bellows is secured in leaktight manner, the third chamber being formed between the back shell of the booster and the apron of the vehicle, wherein the housing comprises a cylindrical peripheral part whose diameter is substantially equal to that of the casing of the booster, and formed with an aperture associated with the filter element disposed in the third chamber in the immediate vicinity of the aperture, the third chamber having a volume at least equal to a minimal volume of the second chamber, and the means for securing the booster to the apron of the vehicle passing in leaktight manner through the third chamber.

2. The booster according to claim 1, wherein the bellows possess an end part secured in leaktight manner to the control rod via an intermediate part having, in the third chamber, a concave shape.

3. The booster according to claim 1, wherein the aperture is directed downwardly when the booster is secured to the apron of the vehicle.

4. The booster according to claim 1, wherein the third chamber is formed with two apertures, and in that a forced circulation of air is established between the two apertures.

5. The booster according to claim 1, wherein an aperture is formed inside a tubular cylindrical extension of the housing, one end of a pipe being connected to the tubular cylindrical extension and another end of the pipe being associated with the filter element.

6. The booster according to claim 5, wherein the aperture is formed in a cylindrical peripheral part of the housing.

7. The booster according to claim 5, wherein the tubular cylindrical extension passes in leaktight manner through an aperture in the apron.

8. A pneumatic brake-booster for a vehicle comprising an engine compartment and a passenger space which are separated by an apron, the booster comprising a casing formed of a front shell and of a back shell and inside which is located a piston comprising a back tubular part and supporting a skirt which, with the aid of an unrolling membrane, defines a first chamber connected selectively to a one of the front chamber and to atmosphere by valve means actuated by a control rod, and the casing comprising means for securing the booster to the apron of the vehicle, the booster comprising a third chamber connected permanently to the atmosphere through a filter element and selectively to the second chamber by the valve means, the volume of the third chamber being partially delimited by a bellows secured in leaktight manner to the control rod, wherein the bellows is also secured in leaktight manner to a cylindrical extension directed toward the back of the back shell of the booster and is formed with a tubular extension connected by piping to the third chamber, the third chamber having a volume at least equal to a minimal volume of the second chamber.

\* \* \* \* \*